Dec. 23, 1969  K. J. SCHMIDT  3,485,505
AXLE LOAD DISTRIBUTING APPARATUS
Filed Jan. 23, 1968  2 Sheets-Sheet 1
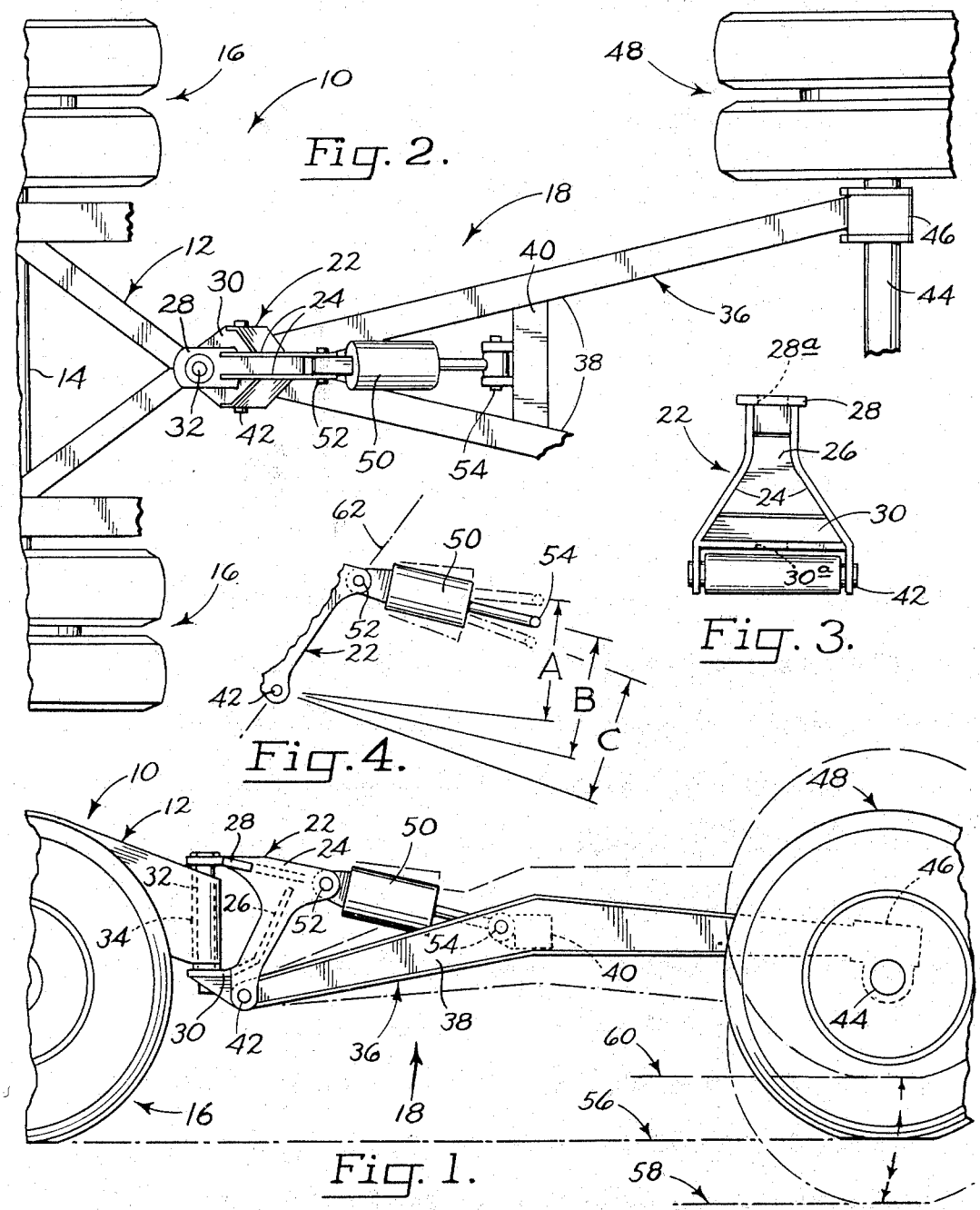
Kenneth J. Schmidt
INVENTOR
BY
Kalisch & Hartwell
Attys.

Dec. 23, 1969    K. J. SCHMIDT    3,485,505
AXLE LOAD DISTRIBUTING APPARATUS
Filed Jan. 23, 1968    2 Sheets-Sheet 2
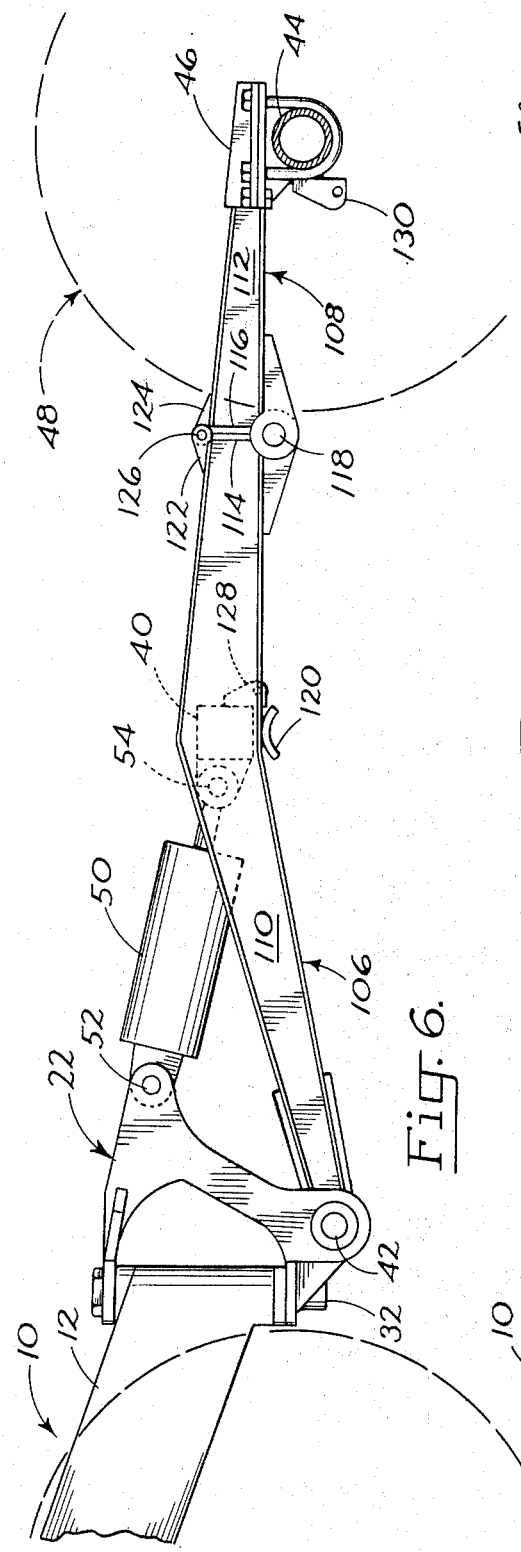
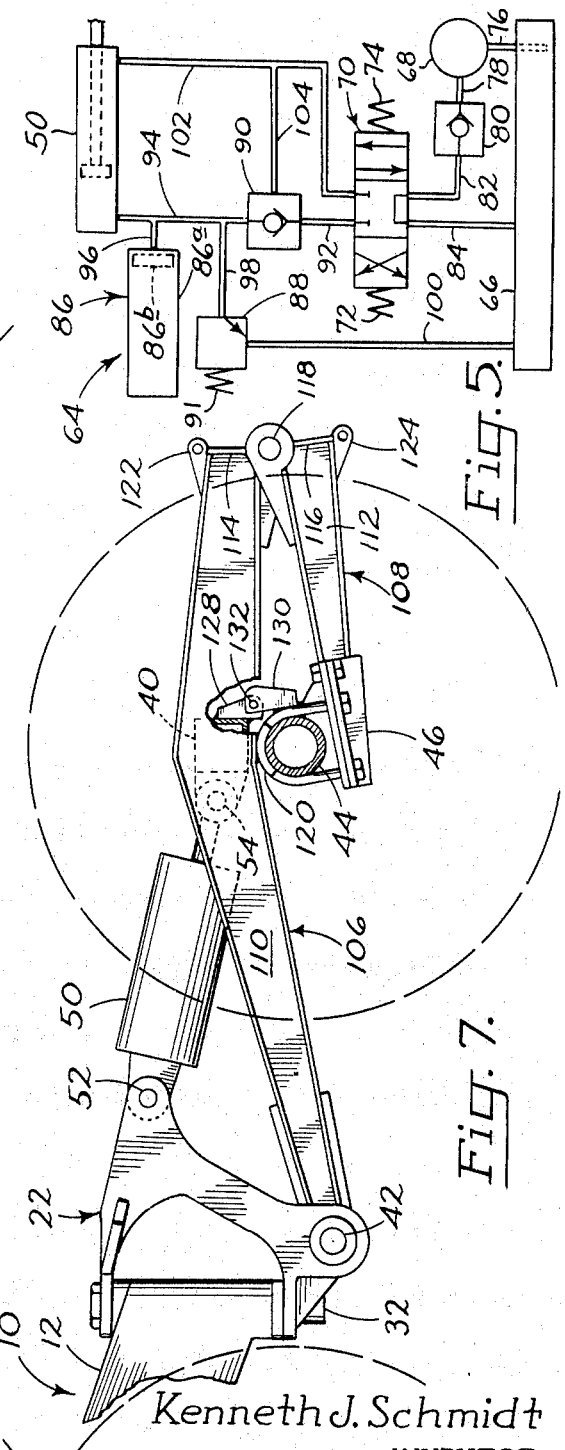
Kenneth J. Schmidt
INVENTOR
BY
Kolisch & Hartwell
Attys.

United States Patent Office 3,485,505
Patented Dec. 23, 1969

3,485,505
AXLE LOAD DISTRIBUTING APPARATUS
Kenneth J. Schmidt, Springfield, Oreg., assignor to General Trailer Company, Inc., Springfield, Oreg., a corporation of Oregon
Filed Jan. 23, 1968, Ser. No. 699,885
Int. Cl. B62d *21/00, 21/14*
U.S. Cl. 280—81　　　　　　　　　　　　　　　　11 Claims

ABSTRACT OF THE DISCLOSURE

An axle load-distributing device detachably mounted on the rear of a vehicle frame including a wheel-supported axle for sharing a load carried on the frame. The amount of load which is transmitted to the ground through the axle is determined by a hydraulic ram in the device which, together with an accumulator that is connected to the ram, operates to maintain such load transmission at a substantially constant level.

---

This invention relates to apparatus which may be attached to the rear of an axle-supported vehicle frame to distribute axle loads.

Most states have laws, for the protection of their highways, limiting the maximum load which can be transmitted through an axle supporting the frame in a vehicle. Frequently, however, it is difficult if not impossible for a vehicle operator to make maximum use of the load-carrying space in his vehicle without violating such laws. For example, certain type of heavy equipment cannot be transported on present trucks as a single load, but must be disassembled and transmitted in separate loads.

As a result of this situation, axle load-distributing devices have been proposed in the past which may be attached to the frame in a vehicle for the purpose of providing additional axle support for the frame, and for distributing the load carried on the frame over a greater wheel base than that provided by a vehicle alone. However, a problem with many such devices has been that they do not perform satisfactorily on uneven roads which produce substantial up and down movement of the axles in the devices. More specifically, such axle movement often causes the load transmitted therethrough to vary so widely as to exceed the limits permitted by law.

Therefore, a general object of the present invention is to provide novel axle load-distributing apparatus which avoids the difficulty mentioned above.

More particularly, an object of the invention is to provide such apparatus which may be attached to an axle-supported vehicle frame to provide additional axle support for the frame, and which can undergo substantial vertical displacement relative to the frame when traveling over an uneven road without the load that it transmits to the road varying appreciably.

Thus, the invention features a bracket adapted to be hinged to the rear of a vehicle frame for swinging about an upright axis, an elongated frame structure pivoted to the bracket and extending rearwardly therefrom with the rear end of the frame structure supported by a wheel-supported load-distributing axle, and a ram having one end directly pivoted to the bracket and the other end directly pivoted to the frame structure. Also provided is a fluid supply including a conduit which furnishes pressure fluid to the cylinder in the ram to adjust the load transmitted through the load-distributing axle. Operatively connected to this line is a pressure-fluid-responsive cushioning device, taking the form of an accumulator, which compensates for the tendency of pressure to change inside the line (and in the ram cylinder) due to pivoting of the frame structure relative to the bracket.

With up and down movement of the load-distributing axle relative to the vehicle frame, the pivot connections interconnecting the bracket, frame structure and ram cause the ram to swing in a manner producing compensating changes in the effective moment arm about which it acts on the frame structure. Such compensating changes tend to maintain the force transmitted to the ground through the load-distributing axle at a substantially constant level.

Yet another object of the invention is to provide apparatus of the type so far described wherein the frame structure may comprise a pair of frame sections which are hinged together to permit positioning of the load-distributing axle at different spacings relative to the rear of a vehicle frame. With such construction, the wheel base over which a load carried by a vehicle is distributed can be varied to suit different circumstances.

A further object is to provide such apparatus which is rugged and relatively simple in construction.

These and other objects and advantages attained by the invention will become more fully apparent as the description which follows is read in conjunction with the accompanying drawings, wherein:

FIG. 1 is a side elevation illustrating axle load-distributing apparatus constructed according to the invention and attached to the rear part of a truck frame, with various parts in the apparatus shown in different positions;

FIG. 2 is a fragmentary plan view, on the same scale as FIG. 1, further illustrating the load-distributing apparatus of FIG. 1;

FIG. 3 is an enlarged front elevation illustrating a bracket employed in the apparatus of FIGS. 1 and 2 with the apparatus detached from the truck frame;

FIG. 4 is a simplified fragmentary side view, on the same scale as FIGS. 1 and 2, illustrating a ram employed in the load-distributing apparatus, and showing the various positions which the ram assumes with the parts in the apparatus occupying the different positions shown in FIG. 1;

FIG. 5 is a simplified schematic diagram illustrating a hydraulic fluid supply employed according to the invention;

FIG. 6 is a side elevation, on a larger scale than FIG. 1, illustrating a modified form of axle load-distributing apparatus including a frame structure having hinged-together frame sections with such sections shown in one set of positions relative to one another; and FIG. 7 is similar to FIG. 6, but illustrates the sections of the frame structure in another set of relative positions.

Turning now to the drawings and referring first to FIGS. 1 and 2, indicated generally at 10 is the rear part of a truck, or vehicle, including the usual frame, a portion of which is shown at 12. The frame is supported on axles, such as rear axle 14, which carry at their opposite ends wheel assemblies, such as rear wheel assemblies 16 mounted on axle 14.

At 18 is axle load-distributing apparatus constructed according to the invention, detachably mounted (in a manner which will be more fully discussed) on the rear of frame 12. In general terms, apparatus 18 functions to assume a part of a load that would normally be carried through axle 14 of the truck, and thus serves to distribute such a load.

Referring to FIGS. 1–3, apparatus 18 includes a bracket 22 which has a pair of laterally spaced side parts 24 having the configurations indicated. Parts 24 are joined together through a central web 26, and upper and lower flanges 28, 30, respectively, which extend between the side parts. Flanges 28, 30 are provided with bores 28a, 30a, respectively, (shown in FIG. 3) which are axially aligned with one another.

Bracket 22 is detachably hinged to frame 12 for swinging about an upright axis by means of a pin 32. The pin extends through bores 28a, 30a, and through an upright collar 34 which is suitably anchored to frame 12.

Further describing apparatus 18, it comprises an elongated frame structure 36 including a pair of side members 38 joined intermediate their opposite ends by a cross member 40. Referring particularly to FIG. 2, the forward set of ends of members 38 are suitably joined together, and the members diverge as they progress toward their respective rear ends.

The forward end of structure 36 is pivoted to side parts 24 in bracket 22 through a pivot connection, or first pivot means, 42. Pivot connection 42 permits pivoting of the frame structure relative to the bracket about a substantially horizontal axis which is disposed transversely to the longitudinal axis of the frame structure. The rear end of structure 36 is supported on an elongated, substantially horizontal, transversely disposed axle 44 through mounts, such as mount 46 shown in FIG. 2, joining the rear ends of members 38 to opposite ends of the axle. Axle 44 constitutes a load-distributing axle herein. Suitably mounted on opposite ends of axle 44, outwardly of mounts 46, are wheel assemblies 48 which support the axle, and the rear of frame structure 36, for movement over the ground.

Also forming part of the load-distributing apparatus is a double-acting hydraulic ram, or extensible device, 50. The ram's cylinder is pivoted to the side parts in bracket 22 through a pivot connection, or second pivot means, 52 disposed above and rearwardly of pivot connection 42. Pivot connection 52 permits swinging of the ram about an axis substantially paralleling the pivot axis provided by connection 42. The rod of ram 50 is mounted on cross member 40 through a pivot connection, or third pivot means, 54 disposed as shown above and rearwardly of connection 42. Pivot connection 54 also provides a pivot axis substantially paralleling that provided by connection 42.

Referring to FIG. 1, various parts in apparatus 18 are illustrated in several different positions. More specifically, the frame structure and ram are illustrated in solid outline in the positions which they occupy with wheel assemblies 48 resting on ground, indicated generally at 56, which occupies the same plane as the ground supporting wheel assemblies 16. In dash-dot outline the frame structure and ram are illustrated in the positions which they occupy with wheel assemblies 48 supported on ground, indicated at 58, occupying a plane which is below that of the ground supporting wheel assemblies 16. In dashed outline, the frame structure and ram are illustrated in the positions which they occupy with wheel assemblies 48 supported on ground, indicated generally at 60, lying in a plane which is higher than that of ground supporting wheel assemblies 16. Such positions are representative of those which may be occupied as truck 10 and apparatus 18 travel over a highway.

Turning now to FIG. 4, here bracket 22 and ram 50 are removed from the apparatus to illustrate more clearly the disposition of the ram's longitudinal axis relative to a line 62 which extends in the plane of FIG. 4 through pivot connections 42, 52 with the ram occupying a set of different positions corresponding to those shown in FIG. 1. More specifically, with the ram moved from its solid outline position downwardly to its dash-dot outline position, its longitudinal axis shifts more closely to a position where it is disposed normal to line 62. Conversely, with the ram moved upwardly to its dashed outline position, its longitudinal axis moves more nearly to a position of alignment or coincidence with line 62.

The effect of such swinging of the ram's longitudinal axis is to vary the length of the effective moment arm through which the ram acts on structure 36. With the ram in its solid outline position, the effective moment arm has a length indicated at B. As the ram swings up to its dashed outline position, the moment arm length decreases to that indicated at A. On the other hand, with the ram swung down to its dash-dot outline position, the moment arm length increases to that shown at C.

For a given force exerted by the ram's rod through pivot connection 54 on frame structure 36, the moment produced by the ram on the frame structure is directly related to the moment arm distance through which the ram acts. Thus, for a given force transmitted through the ram, upward swinging thereof causes a decrease in the moment produced on the frame structure, and downward swinging of the ram produces the reverse.

Considering now FIG. 5, there is indicated generally at 64 a hydraulic fluid system for supplying pressure fluid to ram 50. The system includes a reservoir 66, a pump 68, and a main control valve indicated at 70. The valve spool of valve 70 is represented by an elongated rectangle divided into three squares. Symbols appearing in these squares indicates how flow takes place through the valve with the spool adjusted to different positions. The valve spool is biased to a neutral position by a pair of biasing springs 72, 74. Pump 68 is connected to reservoir 66 through a conduit 76, and is connected to valve 70 through a conduit 78, a check valve 80, and a conduit 82. Valve 70 is connected directly to the reservoir by a conduit 84.

Further included in the system is an accumulator, or pressure-responsive cushioning device, 86, a pressure relief valve 88, and a pilot-operated check valve 90. A biasing spring 91 acts on the valve spool in valve 88. Accumulator 86 may be a conventional unit having the usual cylinder 86a, with a piston 86b mounted for reciprocation inside the cylinder. The left end of cylinder 86a in FIG. 5 is suitably precharged with a gas such as nitrogen which acts against the left side of piston 86b in FIG. 5. Piston 86b is shown in a position where it is closely adjacent the right end of cylinder 86a, which is the position that it normally occupies due to the gas-produced force acting on the left side of the piston.

Valve 70 is connected to the butt end of the cylinder in ram 50 through check valve 90, a conduit 92 and a conduit 94. Connecting the right side of cylinder 86a to conduit 94 is a conduit 96. Relief valve 88 is connected to conduit 94 through a conduit 98, and is connected to reservoir 66 through a conduit 100. A conduit 102 connects valve 70 to the rod end of the cylinder in ram 50, and a conduit 104 connects conduit 102 to the pilot inlet of check valve 90.

To extend ram 50, the valve spool of valve 70 is shifted to the right on FIG. 5 to admit pressure fluid to conduit 92 and to exhaust fluid from conduit 102. To contract the ram, the valve spool is shifted to the left to admit pressure fluid to conduit 102 and to exhaust fluid from conduit 92.

Explaining now how the apparatus so far described operates, with the wheels in wheel assemblies 16, 48 supported on ground lying in substantially the same plane, and the apparatus attached as shown to frame 12, ram 50 is extended. This action urges the wheels in assemblies 48 downwardly against the ground, and thereby distributes to axle 44 and assemblies 48 some of the load on the truck's frame which would ordinarily be carried solely through the truck's axles.

As axle 44 assumes a part of the load on the truck, the pressure of fluid in the butt end of the ram's cylinder, and in conduits 94, 96, increases, and when the pressure of such fluid exceeds a certain level, which may be a relatively small level, piston 86b in the accumulator shifts to the left in FIG. 5 to a new position inside cylinder 86a. More specifically, the piston shifts to a position where the gas-produced and hydraulic fluid-produced forces on the piston are equal.

Ram 50 is extended until the desired load is carried by axle 44. This may be determined in any suitable manner. Typically, this load will be considerably less than the maximum axle load which is permitted on the roads over which the truck will be traveling. The valve spool in valve 70 is then returned to its neutral position with the exhaust of fluid from the butt end of ram 50 then blocked.

As the truck and apparatus 18 travel over a road, on wheel assemblies 48 elevating relative to assemblies 16, ram 50 contracts to permit upward swinging of frame structure 36 about pivot connection 42. Ram 50 can readily contract because of the action of the piston in accumulator 86 which compresses the gas acting against the left side thereof in FIG. 5. While contraction of ram 50 produces an increase in the pressure of fluid in the butt end of the ram, and hence an increase in the force transmitted through the ram, this pressure increase in compensated for and minimized by the action of piston 86b in the accumulator. With the apparatus shown, in fact, a substantial vertical displacement of wheel assemblies 48 and frame assembly 36, with resulting ram contraction, produces only a relatively small increase in the force which the ram exerts on the frame structure.

Further, with contraction of the ram, its longitudinal axis moves more nearly to a position of alignment with previously mentioned line 62 (FIG. 4), and such action minimizes the moment produced by the ram on frame structure 36. Thus, as wheel assemblies 48 move up to accommodate a high point in the road relative to the point supporting wheel assemblies 16, the load transmitted through axle 44 remains very nearly constant.

A similar but reverse action takes place when wheel assemblies 48 and frame structure 36 swing down relative to wheel assemblies 16. In this case, ram 50 extends, but due to the movement of its longitudinal axis (whereby the same shifts toward a position more nearly normal with line 62), and due to the action of accumulator 86, the force which the ram exerts on structure 36, and the load transmitted through axle 44, remain nearly constant.

Turning now to FIGS. 6 and 7, these illustrate a modified form of the invention. In these figures, parts of the apparatus which are similar to those parts already described are designated by similar reference characters. According to this modification, the frame structure includes front and rear frame sections 106, 108, respectively. Section 106 includes a pair of side members, such as side member 110, which are joined adjacent their forward ends (their left ends in FIGS. 6 and 7) in substantially the same manner as previously mentioned members 38 (FIGS. 1 and 2), and which diverge progressing toward their rear ends. Cross member 40 extends between and joins members 108, at the location shown.

Frame section 108 includes a pair of side members, such as side member 112. The forward ends of members 112 (the left ends in FIG. 6) are spaced apart by substantially the same distance as the rear ends of members 110. Members 112 diverge progressing toward their rear ends (their right ends in FIG. 6) at substantially the same angle as the angle of divergence of members 110. The rear ends of members 112 are supported through mounts 46 on axle 44.

Joined to the adjacent sets of ends of members 110, 112 are plates, such as plates 114, 116, respectively. With section 108 occupying an extended position (the one in which it is shown in FIG. 6) relative to section 106, plates 114, 116 abut one another.

Sections 106, 108 are joined together through a hinge assembly 118, or joining means, which permits swinging of section 108 relative to section 106 about a substantially horizontal axis which extends transversely of the longitudinal axes of the sections. More specifically, assembly 118 permits section 108 to swing from its extended position in FIG. 6 to a retracted position shown in FIG. 7 where it lies beneath the rear part of section 106. With section 108 in its retracted position, the then upper surface of axle 44 seats against a pair of laterally spaced downwarly facing arcuate saddles, such as saddle 120, suitably anchored to cross member 40. It will be noted that axle 44, when seated against saddle 120, is disposed rearwardly of pivot connection 54. Saddles 120, together with plates 114, 116, constitute limiting means herein limiting swinging of section 108 between such extended and retracted positions.

According to the invention means are provided for locking sections 106, 108 together with the latter in either one of its positions. Thus, mounted adjacent plates 114, 116 are pairs of lugs, such as lugs 122, 124, provided with suitable bores which come into axial alignment with plates 114, 116 abutting one another. Pins, such as pin 126, extend through such bores to lock section 108 in its extended position. In addition, mounted on cross member 40 are laterally spaced lugs, such as lug 128. Mounted on mount 46 are a pair of laterally spaced lugs, such as lug 130, which, with section 108 in its retracted position, occupy positions directly adjacent lugs 128. Referring to FIG. 7, lugs 128, 130 are provided with suitable bores which are axially aligned with axle 44 disposed against saddles 120. Section 108 is locked in its retracted position by means of pins, such as pin 132, received in such bores.

The apparatus shown in FIGS. 6 and 7 performs in substantially the same manner as the apparatus earlier described. However, with the frame structure having hinged-together frame sections permitting positioning of the load-distributing axle at different distances from the rear of a vehicle frame, a relatively wide range of load distributing conditions can be accommodated.

Thus, the invention provides relatively simple apparatus for distributing axle loads which is capable of performing satisfactorily even over relatively uneven roads. As an example, apparatus has been constructed according to the invention wherein the wheel assemblies supporting the load-distributing axle can shift as much as eight inches up or eight inches down relative to the wheel assemblies in a truck, with the load which is transmitted through the load-distributing axle varying less than three percent.

Such action results from the novel positioning of the ram relative to the pivot connections connecting the ram, frame structure and bracket, whereby swinging of the frame structure produces compensating changes in the moment which the ram exerts on the frame structure. Cooperating also in the accumulator which accommodates ram extension and contraction while minimizing the resulting changes in the forces transmitted through the ram.

With the ram connected in the manner shown, whenever it is desired to lift the wheel assemblies in the load-distributing apparatus off the ground, ram 50 can be contracted to accomplish this.

While the invention has been described herein in connection with a preferred embodiment and a modification thereof, it is appreciated that variations and modifications may be made without departing from the spirit of the invention.

It is claimed and desired to secure by Letters Patent:
1. Axle load-distributing apparatus for a vehicle having a vehicle frame supported on wheel-supported axles in operative position comprising
    a bracket detachably mounted on the rear of said vehicle frame,
    elongated frame structure extending rearwardly away from said bracket,
    first pivot means pivoting the forward end of said frame structure to said bracket accommodating swinging of the frame structure relative to the bracket about a substantially horizontal axis,
    at least one wheel-supporting load-distributing axle mounted on and supporting the rear end of said frame structure for movement over the ground,
    an elongated, pressure-fluid-operated extensible device interposed between and acting on said bracket and said frame structure,
    second pivot means pivoting one end of said extensible device directly to said bracket at a location on the bracket spaced from said first pivot means, said second pivot means accommodating swinging of the device about a substantially horizontal axis, and third pivot means pivoting the other end of said device directly to said frame structure at a point on the frame structure intermediate said first pivot means and said load-distributing axle, said third pivot means being so positioned oin said frame structure that, with upward swinging of the frame structure relative to said bracket, movement of said third pivot means produces swinging of said device in a direction tending to align its longitudinal axis with the line along which said first and second pivot means lie, and with downward swinging of the frame structure, movement of the third pivot means produces swinging of the device in a direction tending to orient the device's longitudinal axis in a direction normal to such line.

2. The apparatus of claim 1, wherein said second pivot means is disposed above and rearwardly of said first pivot means, and said third pivot means is disposed above said first pivot means and rearwardly of said second pivot means.

3. The apparatus of claim 1, wherein said bracket is mounted on the rear of the vehicle frame through a hinge connection.

4. The apparatus of claim 3, wherein said frame structure, when viewed in plan, has an A-shaped configuration.

5. The apparatus of claim 1, wherein said frame structure comprises a pair of elongated frame sections, one supported by said first pivot means and the other supported by said load-distributing axle, and means joining said sections accommodating movement of the sections relative to one another to adjust the spacing between said load-distributing axle and said first pivot means.

6. The apparatus of claim 5, wherein said second pivot means is disposed above and rearwardly of said first pivot means, and said third pivot means is disposed above said first pivot means and intermediate said second piivot means and said joining means.

7. The apparatus of claim 5, wherein said joining means comprises a hinge assembly connecting together one set of ends of said frame sections accommodating swinging of the sections relative to one another about a substantially horizontal axis which extends transversely of the longitudinal axes of the sections.

8. The apparatus of claim 7 which further comprises means limiting the amount of relative swinging movement permitted between said frame sections, said limiting means permitting swinging of said other frame section between extended and retracted positions relative to said one frame section, and means for selectively and releasably locking said frame sections together with said other frame section occupying either one of said positions.

9. The apparatus of claim 8, wherein said other frame section, in its said extended position extends rearwardly away from said one frame section with said load-distributing axle spaced rearwardly of said hinge asembly, and in its said retracted position extends beneath said one frame section with the load-distributing axle disposed below the one frame section and spaced forwardly of said hinge assembly.

10. The apparatus of claim 1, wherein said extensible device comprises a double-acting hydraulic ram which extends and contracts with pivotal movement of said frame structure about the axis provided by said first pivot means, and there is a hydraulic fluid supply communicating with said ram, said supply including a conduit for admitting fluid to and exhausting it from one end of said ram, and a fluid-pressure-responsive cushioning device operatively connected to said conduit operable to compensate for the tendency of the pressure of fluid in said conduit to vary due to the action of said frame structure on said ram.

11. The apparatus of claim 5, wherein said extensible device comprises a double-acting hydraulic ram which extends and contracts with pivotal movement of said frame structure about the axis provided by said first pivot means, and there is a hydraulic fluid supply communicating with said ram, said supply including a conduit for admitting fluid to and exhausting it from one end of said ram, and a fluid-pressure-responsive cushioning device operatively connected to said conduit operable to compensate for the tendency of the pressure of fluid in said conduit to vary due to the action of said frame structure on said ram.

References Cited

UNITED STATES PATENTS

| 2,360,902 | 10/1944 | Simmons | 280—406 |
| 2,974,976 | 3/1961 | Lyall | 280—405 X |
| 3,065,803 | 11/1962 | Pierson | 280—43.23 X |
| 3,191,961 | 6/1962 | Brennan et al. | 280—81 |
| 3,191,963 | 6/1965 | Prichard | 280—81 |
| 3,246,884 | 5/1966 | Prichard et al. | 280—81 X |
| 3,269,748 | 8/1966 | Mazery | 280—405 |

FOREIGN PATENTS 975,234   11/1964   Great Britain.

KENNETH H. BETTS, Primary Examiner

U.S. Cl. X.R.

280—34, 405